Figure 1:
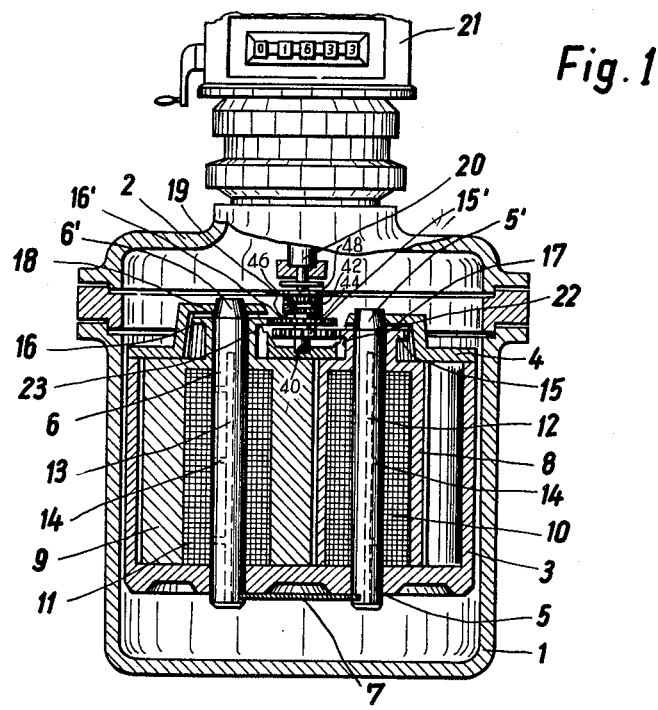

June 15, 1965  W. BÜCHLER  3,188,863
ROTARY METERS FOR FLUIDS
Filed Jan. 8, 1962

Inventor:
Waldemar Buchler
By Stevens Davis Miller & Mosher
Attorneys 3,188,863
ROTARY METERS FOR FLUIDS
Waldemar Büchler, Bad Durkeim, In der Seebach, Germany, assignor to Bopp & Reuther G.m.b.H., Mannheim-Waldhof, Germany
Filed Jan. 8, 1962, Ser. No. 164,919
Claims priority, application France, Feb. 24, 1961, 7,095
3 Claims. (Cl. 73—261)

It is known to use meters incorporating rotors for measuring flowing fluids. In most cases these rotors take the form of annular rotors or preferably of toothed, coupled, oval bodies which are either fixed on rotating shafts or rotate on fixed shafts.

In the case of meters with oval rotors, the ends of the spindles carrying the rotors are in the first instance mounted in carbon sleeves which however brings a whole series of disadvantages. The available length of the bearings is in fact small because of the limited thickness of the cover or base of the measuring chamber, and it is moreover extremely difficult to secure the sleeves axially owing to the contraction or expansion which may be produced, for instance by fluctuations in the temperature of the measured fluids. Even slight displacements of the sleeves have an intolerable effect on the measuring precision of the meter.

If on the other hand the rotors turn on fixed spindles, these spindles could hitherto be fixed only at one end in the measuring chamber, so as to enable the other end to transfer the rotary movement. But, particularly when large quantities of fluid are passing through the meter at high pressure, spindles mounted only at one end are insufficiently secured against any deviation from the parallel; since even slight variations of the parallel positions of the two spindles prevent the rotors from rotating freely, the measuring accuracy suffers or the running of the rotors is completely upset.

The present invention aims at achieving maximum measuring accuracy by providing fixed spindles on which the rotors, preferably of the lobe type, rotate and which are mounted in the measuring chamber by both ends. The rotary movement of the rotors is advantageously transferred by at least one pinion which is rigidly connected to one of the rotors and engages another pinion mounted outside the measuring chamber through an opening in the measuring chamber, preferably in its cover. The measuring chamber or its cover is advantageously constructed so that the external pinion can engage laterally with the pinion of the rotor. Either the pinion which is secured to the rotor, or the external pinion, or both, project through the measuring chamber, preferably near the cover.

Figure 2:
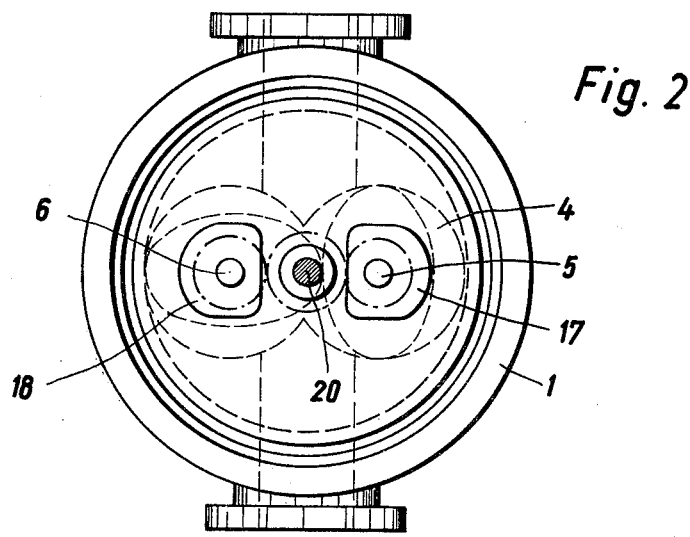

Further details of the invention are illustrated in the accompanying drawings, which show an example of the meter of the invention. In the drawings:

FIG. 1 is an axial section through the meter, and
FIG. 2 is a plan view of the meter after removal of the housing cover.

The housing cover 2 is fixed to the housing 1 by screws or bolts (not shown). The measuring chamber 3 is fastened inside the housing 1 and closed by the measuring chamber cover 4. The two spindles 5 and 6 carrying the rotating pistons take the form of knockout spindles. At least one of their ends, and preferably that end 5' or 6' facing the cover 2 is frusto conical, so that when the spindles are inserted longitudinally not only are they easily placed or fitted in the corresponding frusto conical bearings but they can also be fixed quite securely in their final positions. When assembled, the spindles 5 and 6 are fixed in their final position by a securing member 7, which is preferably common to both spindles.

The two rotors 8 and 9 are arranged inside the measuring chamber and turn about the fixed spindles 5 and 6 with the aid of the carbon sleeves 10 and 11. There was previously an obvious disadvantage, in that since the carbon sleeves bore on the spindles over such a great length, the fluid to be measured—which also served as a lubricant—had difficulty in flowing around the whole bearing surface. The replenishment of the lubricant in these places was particularly problematical. This disadvantage is eliminated in a further embodiment of the invention, in which the spindles 5 and 6 have axial bores 12 and 13, from which supply channels 14 lead to several parts of the bearing surfaces.

In the example shown, each of the two rotors 8 and 9 has a pinion 15 and 16, respectively. In order both to avoid using excessively long carbon sleeves 10, 11, and to enable the pinions to turn inside the two measuring chamber domes 17 and 18, the rotors have hollow prolongations at the end where the pinions are, which prolongations either form the pinions themselves or carry separately constructed pinions. The two pinions 15 and 16 engage the intermediary pinions 15' and 16' which in known manner form part of an addition gearing, by which the counter 21 is driven through the shaft 20. Gear 15' is connected by a shaft 40 to drive planet gears 42 and gear 16' is connected by a hollow shaft 44 to drive gear 46. Gear 48 is secured to shaft 20 and is in engagement with planet gears 42. Planet gears 42 and sun gears 46, 48 form an epicyclic gear train. The domes 17 and 18 of the measuring chamber are provided with slots 22 and 23 through which the pinions 15 and 15' engage on one side and 16 and 16' on the other. The pinions 15 and 16 mounted on the hollow prolongations of the rotary pistons and the intermediate pinions 15' and 16' can at the same time project through the slots 22 and 23, according to the size of these pinions. The pinion pairs 15–15' and 16–16' can even engage in the slot itself. In the case shown, the method of transferring the rotation of the two rotors 8 and 9 to the shaft 20 through an addition gearing has the advantage of compensating for the variations in angular speed to which the rotors of known counters are periodically subject, so that they are not transferred to the counter itself.

Instead of providing each of the two rotors with a pinion to project through the corresponding measuring chamber dome and drive the shaft 20 leading to the counter, as in the present example, only one of the rotors need have a pinion to transfer the rotary movement, particularly when a less exact compensation of the angular speed is required. In this case only one measuring chamber dome is provided, and the side of the measuring chamber or measuring chamber cover containing the rotor which has no pinion is constructed as an ordinary bearing for the fixed spindle.

In a further embodiment of the meter according to the invention, a non-return mechanism (not shown) can also be provided between the rotors and the counter. This may be either a ratchet wheel or any known type of free wheel, and it serves to prevent any backward rotation of the counter such as could take place if the liquid channel slopes upwardly to the meter instead of downwardly. A non-return mechanism of this type can be mounted either in the fluid chamber behind the drive pinions or outside the fluid chamber in the dry chamber.

Not only does a meter according to the invention combine the advantages of known rotary meters, but owing to the particular construction and fixing of the spindles and the direct transmission of the movement of the rotors it is also easier to assemble and measures more accurately. Moreover, owing to the symmetrical arrangement of the spindles and the supply of lubricant to the carbon sleeves, such a meter is more wear-resistant and durable, and yet needs much less maintenance than the known rotary meters now in general use.

I claim:

1. A fluid meter comprising a measuring chamber, a pair of spindles fixedly secured to opposite walls of the chamber, a rotor rotatably mounted on each of said spindles, means for passing a fluid through said chamber to drive the rotors, means for indicating the volume of fluid passing through the chamber, and driving means connecting the indicating means to the rotors, said driving means comprising a gear on one end of each rotor, a pair of gears mounted in engagement with the gears of the rotors, means mounting one of said pair of gears to drive a sun gear of an epicyclic gear train, means mounting the other of said pair of gears to drive a planet gear of said gear train, a second sun gear mounted in meshing engagement with the planet gear, and a shaft connecting said second sun gear to the indicator.

2. A device as in claim 1 wherein one wall of the chamber comprises a removable cover and openings in the cover at the zone of meshing of said pair of gears and the gears of the rotors.

3. A device as in claim 1 wherein one wall of the chamber comprises a removable cover and the means for fixedly securing the spindles to said one wall comprises frusto-conical openings in said wall and complemental tapers on the spindles fitted in said openings.

References Cited by the Examiner

UNITED STATES PATENTS

| | | | |
|---|---|---|---|
| 294,026 | 2/84 | Fitts | 73—261 |
| 386,795 | 7/88 | Ball | 73—261 |
| 387,828 | 8/88 | Thomson | 73—275 |
| 440,559 | 11/90 | Glad | 73—275 |
| 1,233,599 | 7/17 | Nuebling | 73—261 X |
| 2,383,226 | 8/45 | Swindle | 73—261 |
| 2,453,766 | 11/48 | Thayer | 73—261 |
| 2,683,224 | 7/54 | Cole | 73—231 |
| 2,812,661 | 11/57 | Cox | 73—231 |

RICHARD C. QUEISSER, *Primary Examiner.*

ROBERT L. EVANS, *Examiner.*